United States Patent
Xie et al.

(10) Patent No.: US 10,613,688 B2
(45) Date of Patent: Apr. 7, 2020

(54) TOUCH SUBSTRATE, TOUCH PANEL AND TOUCH APPARATUS HAVING THE SAME, AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Xiaodong Xie, Beijing (CN); Ming Hu, Beijing (CN); Ming Zhang, Beijing (CN); Jing Wang, Beijing (CN); Jian Tian, Beijing (CN); Min He, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 183 days.

(21) Appl. No.: 15/542,209

(22) PCT Filed: Aug. 16, 2016

(86) PCT No.: PCT/CN2016/095511
§ 371 (c)(1),
(2) Date: Jul. 7, 2017

(87) PCT Pub. No.: WO2018/032353
PCT Pub. Date: Feb. 22, 2018

(65) Prior Publication Data
US 2018/0267644 A1 Sep. 20, 2018

(51) Int. Cl.
*G06F 3/041* (2006.01)
*G06F 3/044* (2006.01)

(52) U.S. Cl.
CPC .............. *G06F 3/044* (2013.01); *G06F 3/041* (2013.01); *G06F 3/0414* (2013.01);
(Continued)

(58) Field of Classification Search
CPC ....................................................... G06F 3/041
See application file for complete search history.

(56) References Cited

U.S. PATENT DOCUMENTS

2012/0218221 A1 8/2012 Igeta
2013/0082970 A1* 4/2013 Frey ...................... G06F 3/0414
345/173

(Continued)

FOREIGN PATENT DOCUMENTS

CN 105068695 A 11/2015
CN 105117089 A 12/2015

(Continued)

OTHER PUBLICATIONS

First Office Action in the Korean Patent Application No. 20177020229, dated Jun. 11, 2018; English translation attached.
International Search Report & Written Opinion dated May 19, 2017, regarding PCT/CN2016/095511.

*Primary Examiner* — Chanh D Nguyen
*Assistant Examiner* — Nguyen H Truong
(74) *Attorney, Agent, or Firm* — Intellectual Valley Law, P.C.

(57) ABSTRACT

The present application discloses a touch substrate including a first touch electrode group having a plurality of rows of first touch electrodes; a second touch electrode group having a plurality of first columns of second touch electrodes; a third electrode group having a plurality of second columns of third electrodes. First touch electrodes in each row are spaced apart from each other along a row direction; second touch electrodes in each first column are spaced apart from each other along a first column direction; third electrodes in
(Continued)

each second column are spaced apart from each other along a second column direction; the plurality of rows of first touch electrodes crossing over the plurality of first columns of second touch electrodes forming a plurality of first intersections; the plurality of rows of first touch electrodes crossing over the plurality of second columns of third electrodes forming a plurality of second intersections. Two first touch electrodes from two adjacent rows and two second touch electrodes from two adjacent first columns surround a third electrode.

19 Claims, 10 Drawing Sheets

(52) U.S. Cl.
CPC .............. *G06F 2203/04103* (2013.01); *G06F 2203/04105* (2013.01); *G06F 2203/04111* (2013.01)

(56) References Cited

U.S. PATENT DOCUMENTS

| | | | |
|---|---|---|---|
| 2014/0313159 A1* | 10/2014 | Wilson | G06F 3/044 |
| | | | 345/174 |
| 2015/0123942 A1 | 5/2015 | Huang | |
| 2017/0068368 A1* | 3/2017 | Hsiao | G06F 3/0416 |
| 2017/0083142 A1 | 3/2017 | Wang et al. | |
| 2017/0228075 A1* | 8/2017 | Lin | G06F 3/0412 |
| 2017/0255287 A1* | 9/2017 | Huang | G06F 3/041 |
| 2017/0255303 A1* | 9/2017 | Huang | G06F 3/047 |
| 2017/0322662 A1* | 11/2017 | Hsieh | G02B 6/0088 |

FOREIGN PATENT DOCUMENTS

| | | |
|---|---|---|
| CN | 105204688 A | 12/2015 |
| CN | 204926052 U | 12/2015 |
| CN | 205353969 U | 6/2016 |
| JP | 2011048541 A | 3/2011 |
| KR | 20150052906 A | 5/2015 |

* cited by examiner

FIG. 4

```
Forming a first touch electrode group comprising a plurality of rows of first touch electrodes; each
first touch electrode comprising a first touch electrode block and a second touch electrode block;
first touch electrodes in each row are formed to be spaced apart from each other along a row
direction.
```
↓
```
Forming a second touch electrode group comprising a plurality of first columns of second touch
electrodes; second touch electrodes in each first column are formed to be spaced apart from each
other along a first column direction; the plurality of rows of first touch electrodes crossing over
the plurality of first columns of second touch electrodes forming a plurality of first intersections.
```
↓
```
Forming a third electrode group comprising a plurality of second columns of third electrodes;
third electrodes in second column are formed to be spaced apart from each other along a second
column direction; the plurality of rows of first touch electrodes crossing over the plurality of
second columns of third electrodes forming a plurality of second intersections.
```
↓
```
Forming a first bridge layer comprising a plurality of rows of first bridges; adjacent first touch
electrode block and second touch electrode block along the row direction are electrically
connected at each first intersection through a first bridge.
```
↓
```
Forming a second bridge layer comprising a plurality of first columns of second bridges; two
adjacent second touch electrodes along the first column direction are electrically connected at each
first intersection through a second bridge.
```
↓
```
Forming a third bridge layer comprising a plurality of second columns of third bridges; two
adjacent third electrodes along the second column direction are electrically connected at each
second intersection through a third bridge.
```
↓
```
Forming a fourth bridge layer comprising a plurality of rows of fourth bridges; adjacent first touch
electrode block and second touch electrode block along the row direction are electrically
connected at each second intersection through a fourth bridge.
```

TOUCH SUBSTRATE, TOUCH PANEL AND TOUCH APPARATUS HAVING THE SAME, AND FABRICATING METHOD THEREOF

CROSS-REFERENCE TO RELATED APPLICATION

This application is a national stage application under 35 U.S.C. 371 of International Application No. PCT/CN2016/095511 filed Aug. 16, 2016, the contents of which are incorporated by reference in the entirety.

TECHNICAL FIELD

The present invention relates to touch control technology, more particularly, to a touch substrate, a touch panel and a touch apparatus having the same, and a fabricating method thereof.

BACKGROUND

Conventional touch devices can be generally categorized into resistive, capacitive, optical, sound wave, and electromagnetic designs. In recent years, touch devices have been widely used in many electronic devices such as mobile phones, computer display panels, touch screens, satellite navigation devices, digital cameras, etc. In conventional capacitive touch devices, the point on the display panel touched by a finger is detected by detecting the change in the capacitance of the capacitor coupled with the finger through a touch sensing electrode. The conventional touch devices can only detect a two-dimensional location of a touch event, and are unable to detect a third dimension of the touch event, i.e. a pressure applied by the touch.

SUMMARY

In one aspect, the present invention provides a touch substrate comprising a first touch electrode group comprising a plurality of rows of first touch electrodes; a second touch electrode group comprising a plurality of first columns of second touch electrodes; a third electrode group comprising a plurality of second columns of third electrodes. First touch electrodes in each row are spaced apart from each other along a row direction; second touch electrodes in each first column are spaced apart from each other along a first column direction; third electrodes in each second column are spaced apart from each other along a second column direction; the plurality of rows of first touch electrodes crossing over the plurality of first columns of second touch electrodes forming a plurality of first intersections; the plurality of rows of first touch electrodes crossing over the plurality of second columns of third electrodes forming a plurality of second intersections. Two first touch electrodes from two adjacent rows and two second touch electrodes from two adjacent first columns surround a third electrode.

Optionally, the touch substrate further comprises a fourth electrode group comprising a plurality of fourth electrodes in a layer insulated from the third electrode group; the plurality of third electrodes and the plurality of fourth electrodes are configured so that at least one of the plurality of fourth electrodes and at least one of the plurality of third electrodes are movable relative to each other in response to a pressure from a touch, resulting in a change in distance between the at least one of the plurality of fourth electrodes and the at least one of the plurality of third electrodes, and a detectable capacitance change in response to the change in distance.

Optionally, each of the plurality of fourth electrodes corresponds to one of the plurality of third electrodes, a projection of each of the plurality of fourth electrodes at least partially overlaps with that of a corresponding one of the plurality of third electrodes in plan view of the touch substrate.

Optionally, the touch substrate further comprises an elastic layer between the third electrode group and the fourth electrode group; the elastic layer configured to undergo a restorable deformation in response to a pressure from a touch, resulting in the change in distance between the at least one of the plurality of fourth electrodes and the at least one of the plurality of third electrodes.

Optionally, the touch substrate further comprises a first bridge layer comprising a plurality of rows of first bridges; a second bridge layer comprising a plurality of first columns of second bridges; and a third bridge layer comprising a plurality of second columns of third bridges; two adjacent lint touch electrodes along the row direction are electrically connected at each first intersection through a first bridge; two adjacent second touch electrodes along the first column direction are electrically connected at each first intersection through a second bridge; and two adjacent third electrodes along the second column direction are electrically connected at each second intersection through a third bridge.

Optionally, the touch substrate further comprises a fourth bridge layer comprising a plurality of rows of fourth bridges; each first touch electrode comprises a first touch electrode block and a second touch electrode block; adjacent first touch electrode block and second touch electrode block along the row direction are electrically connected at each first intersection through a first bridge; and adjacent first touch electrode block and second touch electrode block along the row direction are electrically connected at each second intersection through a fourth bridge.

Optionally, the third bridge electrically connecting the two adjacent third electrodes along the second column direction spaces apart, and is insulated from, the adjacent first touch electrode block and second touch electrode block electrically connected through the fourth bridge at a second intersection.

Optionally, the third electrode has a boundary substantially complementary to at least one corresponding portions of the two first touch electrodes from two adjacent rows and the two second touch electrodes from two adjacent first columns surrounding the third electrode.

In another aspect, the present invention provides a touch panel comprising a touch substrate described herein and an additional touch substrate facing the touch substrate.

Optionally, the touch panel further comprises a fourth electrode group comprising a plurality of fourth electrodes in a layer insulated from die third electrode group; the plurality of third electrodes and the plurality of fourth electrodes are configured so that at least one of the plurality of fourth electrodes and at least one of the plurality of third electrodes are movable relative to each other in response to a pressure from a touch, resulting in a change in distance between the at least one of the fourth electrodes and the at least one of the third electrodes, and a detectable capacitance change in response to the change in distance.

Optionally, the third electrode group is in the touch substrate, and the fourth electrode group is in the additional touch substrate.

Optionally, each of the plurality of fourth electrodes corresponds to one of the plurality of third electrodes, a projection of each of the plurality of fourth electrodes at least partially overlaps with that of a corresponding one of the plurality of third electrodes in plan view of the touch substrate.

Optionally, the touch panel further comprises an elastic layer between the third electrode group and the fourth electrode group; the elastic layer configured to undergo a restorable deformation in response to a pressure from a touch, resulting in the change in distance between the at least one of the plurality of fourth electrodes and the at least one of the third electrodes.

Optionally, the touch substrate further comprises a first bridge layer comprising a plurality of rows of first bridges; a second bridge layer comprising a plurality of first columns of second bridges; and a third bridge layer comprising a plurality of second columns of third bridges. Two adjacent first touch electrodes along the row direction are electrically connected at each first intersection through a first bridge; two adjacent second touch electrodes along the first column direction are electrically connected at each first intersection through a second bridge; and two adjacent third electrodes along the second column direction are electrically connected at each second intersection through a third bridge.

Optionally, the touch substrate further comprises a fourth bridge layer comprising a plurality of rows of fourth bridges. Each first touch electrode comprises a first touch electrode block and a second touch electrode block; adjacent first touch electrode block and second touch electrode block along the row direction are electrically connected at each first intersection through a first bridge; and adjacent first touch electrode block and second touch electrode block along the row direction are electrically connected at each second intersection through a fourth bridge.

Optionally, the third bridge electrically connecting the two adjacent third electrodes along the second column direction spaces apart, and is insulated from, the adjacent first, touch electrode block and second touch electrode block electrically connected through the fourth bridge at a second intersection.

Optionally, the third electrode has a boundary substantially complementary to at least one corresponding portions of the two first touch electrodes from two adjacent rows and the two second touch electrodes from two adjacent first columns surrounding the third electrode.

Optionally, the touch panel is an on-cell touch panel; the touch substrate is an array substrate, the additional touch substrate is a package substrate, and the elastic layer is an optically clear resin layer for bonding the touch substrate and the additional touch substrate.

Optionally, the touch panel is an in-cell touch panel; the touch substrate is an array substrate, the additional touch substrate is a package substrate, and the elastic layer is an optically clear resin layer for bonding the touch substrate and the additional touch substrate.

Optionally, the touch panel is an add-on touch panel; the touch substrate is a package substrate, the additional touch substrate is an array substrate, and the elastic layer is an optically clear resin layer for bonding the touch substrate and the additional touch substrate.

Optionally, the touch panel is a one-glass-solution type touch panel.

Optionally, the touch panel is a glass-film-film type touch panel.

Optionally, a ratio among the number of first touch electrodes, the number of second touch electrodes, and the number of third electrodes is in the range of 1:1:1 to 10:10:1.

In another aspect, the present invention provides a method of fabricating a touch panel comprising forming a first touch electrode group comprising a plurality of rows of first touch electrodes; first touch electrodes in each row are formed to be spaced apart from each other along a row direction; forming a second touch electrode group comprising a plurality of first columns of second touch electrodes; second touch electrodes in each first column are formed to be spaced apart from each other along a first column direction; the plurality of rows of first touch electrodes crossing over the plurality of first columns of second touch electrodes forming a plurality of first intersections; and forming a third electrode group comprising a plurality of second columns of third electrodes; third electrodes in each second column are formed to be spaced apart from each other along a second column direction, the plurality of rows of first touch electrodes crossing over the plurality of second columns of third electrodes forming a plurality of second intersections. Two first touch electrodes from two adjacent rows and two second touch electrodes from two adjacent first columns are formed to surround a third electrode.

Optionally, the method further comprises forming a fourth electrode group comprising a plurality of fourth electrodes in a layer insulated from the third electrode group; each of the plurality of fourth electrodes corresponding to one of the plurality of third electrodes; a projection of each of the plurality of fourth electrodes at least partially overlaps with that of a corresponding one of the plurality of third electrodes in plan view of the touch panel.

Optionally, the method further comprises forming an elastic layer between the third electrode group and the fourth electrode group; the elastic layer configured to deform in response to a pressure from a touch.

Optionally, the method further comprises forming a first bridge layer comprising a plurality of rows of first bridges; two adjacent first touch electrodes along the row direction are electrically connected at each first intersection through a first bridge, forming a second bridge layer comprising a plurality of first columns of second bridges; two adjacent second touch electrodes along, the first column direction are electrically connected at each first intersection through a second bridge; and forming a third bridge layer comprising a plurality of second columns, of third bridges; two adjacent third electrodes along the second column direction are electrically connected at each second intersection through a third bridge.

Optionally, the method further comprises forming a fourth bridge layer comprising a plurality of rows of fourth bridges.

Optionally, the step of forming the first touch electrode group comprises forming a plurality of first touch electrode blocks and a plurality of second touch electrode blocks; each of the plurality of first touch electrodes is formed to include a first touch electrode block and a second touch electrode block; adjacent first touch electrode block and second touch electrode block along the row direction are electrically connected at each first intersection through a first bridge; and adjacent first touch electrode block and second touch electrode block along the row direction are electrically connected at each second intersection through a fourth bridge.

Optionally, the third bridge electrically connecting the two adjacent third electrodes along the second column direction is filmed to space apart, and be insulated from, the adjacent first touch electrode block and second touch electrode block electrically connected through the fourth bridge at a second intersection.

Optionally, the third electrode is formed to have a boundary substantially complementary to at least one corresponding portions of the two first touch electrodes from two adjacent rows and the two second touch electrodes from two adjacent first columns surrounding the third electrode.

Optionally, the third electrode group and the electrode group are formed in a same touch substrate.

Optionally, the third electrode group and the fourth electrode group are formed in two different substrates selected from a touch substrate and an additional touch substrate facing the touch substrate, respectively.

In another aspect, the present invention provides a touch apparatus comprising a touch panel described herein or fabricated by a method described herein.

BRIEF DESCRIPTION OF THE FIGURES

The following drawings are merely examples for illustrative purposes according to various disclosed embodiments and are not intended to limit the scope of the present invention.

FIG. 4 is a flow chart illustrating a method of fabricating a touch panel in some embodiments.

DETAILED DESCRIPTION

Figure 1A:
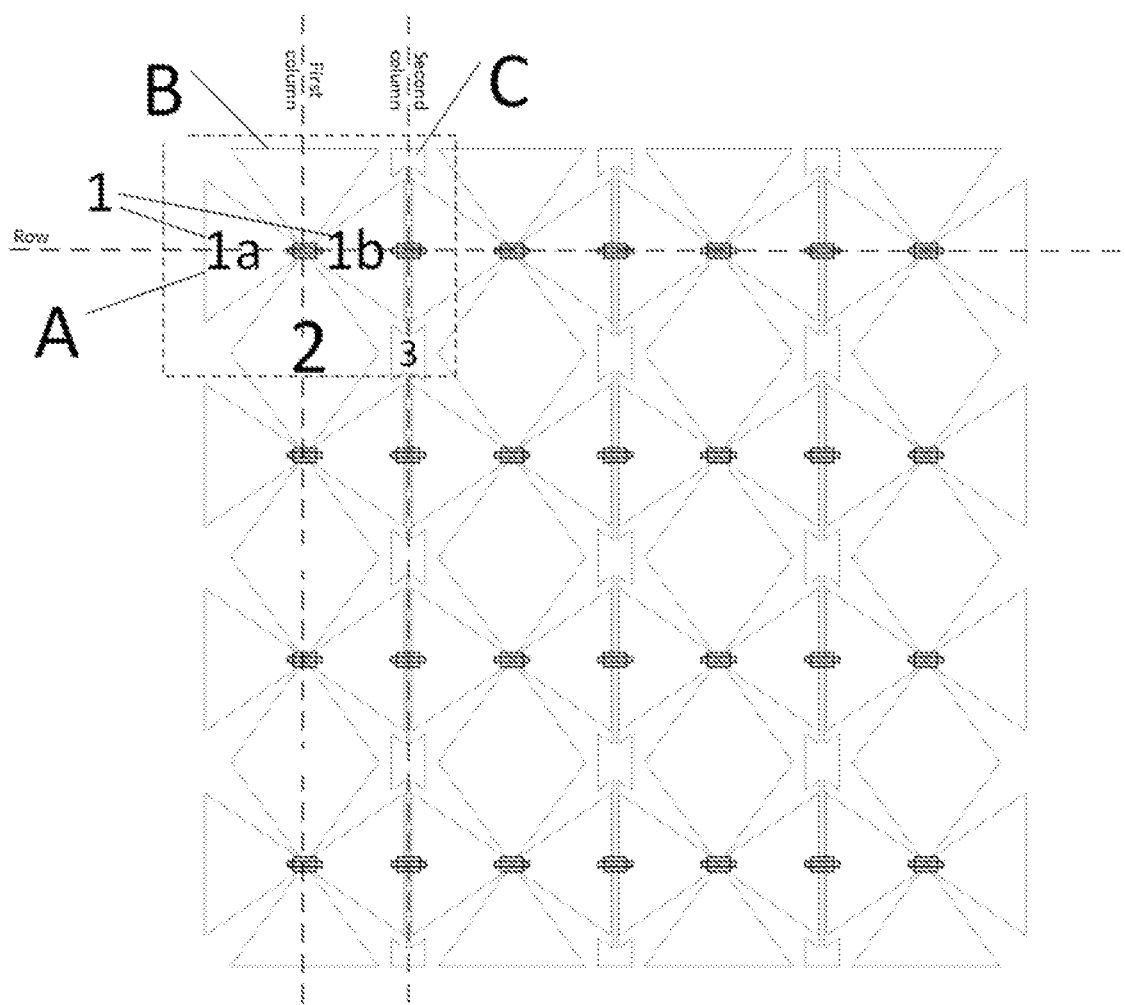
FIG. 1A is a diagram illustrating the structure of a touch substrate in some embodiments.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

In one aspect, the present disclosure provides a novel three-dimensional touch substrate (e.g., a touch display substrate), a touch panel having the same (e.g., a touch display panel), and a fabricating method thereof. In some embodiments, the three-dimensional touch substrate includes a first touch electrode group and a second touch electrode group for detecting a touch position of a touch event by detecting a capacitance change caused by the touch. For example, the first touch electrode group and the second touch electrode group may be touch electrode groups in a mutual capacitive touch panel, or touch electrode groups in a self-capacitive touch panel. The present touch substrate further includes a pressure sensing electrode for detecting an applied pressure. In some embodiments, the pressure sensing electrode is a single pressure sensing electrode, e.g., the touch substrate includes a plurality of pressure sensing electrodes n a single layer. In some embodiments, the present touch substrate includes a pair of pressure sensing electrodes for detecting an applied pressure from a change in distance between the pair of pressure sensing electrodes due to the applied pressure. The pair of pressure sensing electrodes are spaced apart from each other so that a portion of the fourth electrode group and a corresponding portion of the third electrode group around a touch position are capable of moving relative to each other (e.g., moving towards each other) in response to a pressure from a touch, resulting in a change in distance between the portion of the fourth electrode group and the corresponding portion of the third electrode group and a detectable capacitance change in response to the change in distance. For example, one of the third electrode group and the fourth electrode group (the one proximal to the touch object) is capable of moving towards the other one in response to the touch. The pair of pressure sensing electrodes may be spaced apart at least by an elastic layer, which is subject to deformation in response to an applied pressure from a touch. The pair of pressure sensing electrodes and the elastic layer may be all disposed in one touch substrate (e.g., an array substrate or a package substrate). Alternatively, the pair of pressure sensing electrodes may be disposed in two different touch substrate, e.g., one in an array substrate and the other in a package substrate. Accordingly, the elastic layer may be an optically clear resin layer. Optionally, the elastic layer may be a layer of air, a gap between the third electrode group and the fourth electrode group. For example, the array substrate and the package substrate may be frame sealed by a bonding layer in the peripheral area of the display panel for adhering the two substrates, resulting in an empty space between two substrates. The pair of pressure sensing electrodes are capable of moving relative to each other in response to a touch.

Optionally, the first touch electrode group, the second touch electrode group, and the third electrode group are in a same layer. Optionally, the first touch electrode group, the second touch electrode group and the third electrode group are in two or more layers. For examples, the third electrode group may be in, a first layer, and the first touch electrode group and the second touch electrode group may be in a second layer, the first layer being different from the second layer. Optionally, the first touch electrode group, the second touch electrode group and the third electrode group are in three different layers.

In one aspect, the present disclosure provides a touch substrate including the first touch electrode group, the second touch electrode group, and a third electrode group. For examples, the third electrode group may be a single electrode layer for sensing an applied pressure by detecting changes in fringe capacitance between adjacent third electrode blocks in the single electrode layer. In some embodiments, the third electrode group is one of a pair of pressure sensing electrodes. In some embodiments, the touch substrate includes a first touch electrode group having a plurality of rows of first touch electrodes; a second touch electrode group having a plurality of first columns of second touch electrodes; a third electrode group (e.g., a single electrode layer for detecting an applied pressure, or one of the pair of pressure sensing electrodes for detecting an applied pressure) having a plurality of second columns of third electrodes. The first touch electrodes in each row are spaced apart from each other along a row direction. The second touch electrodes in each first column are spaced apart from each other along a first column direction. The third electrodes in second column are spaced apart from each other along a second column direction. The plurality of rows of first touch electrodes cross over the plurality of first columns of second touch electrodes forming a plurality of first intersections (the row direction intersecting the first column direction). The plurality of rows of first touch electrodes cross over the plurality of second columns of third electrodes forming a plurality of second intersections (the row direction intersecting the second column direction). Optionally, two first touch electrodes from two adjacent rows and two second touch electrodes from two adjacent first columns surround a third electrode.

In some embodiments, the touch substrate further includes a first bridge layer having a plurality of rows of first bridges; a second bridge layer having a plurality of first columns of second bridges; and a third bridge layer having a plurality of second columns of third bridges. Two adjacent first touch electrodes along the row direction are electrically connected at each first intersection through a first bridge. Two adjacent second touch electrodes along the first column direction are electrically connected at each first intersection through a second bridge. Two adjacent third electrodes along the second column direction are electrically connected at each second intersection through a third bridge.

In some embodiments, the touch substrate further includes a fourth bridge layer having a plurality of rows of fourth bridges. Each first touch electrode includes a first touch electrode block and a second touch electrode block. Adjacent first touch electrode block and second touch electrode block along the row direction are electrically connected at each first intersection through a first bridge. Adjacent first touch electrode block and second touch electrode block along the row direction are electrically connected at each second intersection through a fourth bridge.

Optionally, the touch substrate includes a first touch electrode group having a plurality of rows of first touch electrodes, each first touch electrode including a first touch electrode block and a second touch electrode block; a second touch electrode group having a plurality of first columns of second touch electrodes; a third electrode group having a plurality of second columns of third electrodes; a first bridge layer having a plurality of rows of first bridges; a second bridge layer having a plurality of first columns of second bridges; a third bridge layer having a plurality of second columns of third bridges, and a fourth bridge layer having a plurality of rows of fourth bridges. The first touch electrodes in each row are spaced apart from each other along a row direction. The second touch electrodes in each first column are spaced apart from each other along a first column direction. The third electrodes in second column are spaced apart from each other along a second column direction. The plurality of rows of first touch electrodes cross over the plurality first columns of second touch electrodes forming a plurality of first intersections (the row direction intersecting the first column direction). The plurality of rows, of first touch electrodes cross over the plurality of second columns of third electrodes forming a plurality of, second intersections (the row direction intersecting the second column direction). Adjacent first touch electrode block and second touch electrode block along the row direction are electrically connected at each first intersection through a first bridge. Adjacent first touch electrode block and second touch electrode block along the row direction are electrically connected at each second intersection through a fourth bridge.

In some embodiments, the first touch electrode group and the second touch electrode group are in different layers. Optionally, the first bridge layer and the first touch electrode group are in a same layer, and the second bridge layer and the second touch electrode group are in a same layer. Optionally, the third electrode group is in a same layer as the first touch electrode group, and the fourth bridge layer and the third bridge layer are in different layers. Optionally, the third electrode group is in a same layer as the second touch electrode group, and the third bridge layer and the second bridge layer are in a same layer.

In some embodiments, the first touch electrode group and the second touch electrode group are in a same layer. Optionally, the second bridge layer is in a same layer as the first touch electrode group and the second touch electrode group, and the first bridge layer is in a layer different from the first touch electrode group and the second touch electrode group. Optionally, the second bridge layer is in a layer different from the first touch electrode group and the second touch electrode group, and the first bridge layer is in a same layer as the first touch electrode group and the second touch electrode group.

In some embodiments, the first touch electrode group, the second touch electrode group, and the third electrode group are all in a same layer. Optionally, the second bridge layer and the third bridge layer are in a same layer as the first touch electrode group, the second touch electrode group, and the third electrode group. Optionally, the first bridge layer and the fourth bridge layer are in a same layer as the first touch electrode group, the second touch electrode group, and the third electrode group. Optionally, second bridge layer and the third bridge layer are in a same first layer, the first bridge layer and the fourth bridge layer are in a same second layer, and the same first layer is a layer different from the same second layer.

In some embodiments, the touch substrate further includes a first insulating layer between the first bridge layer and the second bridge layer. The first insulating layer includes a plurality of first insulating blocks, each of which insulates a first bridge from a second bridge at a first intersection.

In some embodiments, the touch substrate further includes a second insulating layer between the fourth bridge layer and the third bridge layer. The second insulating layer includes a plurality of second insulating blocks, each of which insulates a fourth bridge from a third bridge at a second intersection.

Any appropriate transparent electrode material may be used to make the first touch electrode group, the second touch electrode group, the third electrode group, the first bridge layer, the second bridge layer, the third bridge layer, and the fourth bridge layer. Examples of appropriate transparent electrode materials include, but are not limited to, transparent metals (e.g., nano-silver), indium tin oxide, indium zinc oxide, and a combination thereof.

In some embodiments, two adjacent second touch electrodes along the first column direction are electrically connected at each first intersection through a second bridge. In some embodiments, two adjacent third electrodes along the second column direction are electrically connected at each second intersection through a third bridge.

In some embodiments, each first touch electrode includes a first touch electrode block and a second touch electrode block. Adjacent first touch electrode block and second touch electrode block along the row direction are electrically connected at each first intersection through a first bridge. Adjacent first touch electrode block and second touch electrode block along the row direction are electrically connected at each second intersection through a fourth bridge.

In some embodiments, the adjacent first touch electrode block and second touch electrode block along the row direction are spaced apart at each second intersection to form a passage between the adjacent first touch electrode block and second touch electrode block, for allowing a third bridge extending through the passage and insulated from the adjacent first touch electrode block and second touch electrode block. The spaced-apart, adjacent first touch electrode block and second touch electrode block along the row direction are electrically connected through one or more fourth bridge.

The touch electrodes and the third electrode may have any appropriate shapes. Similarly, the first touch electrode block and the second touch electrode block may have any appropriate shapes. Examples of appropriate shapes include, but are not limited to, a diamond shape, a square shape, a rectangular shape, a triangular shape, and a parallelogram shape. Optionally, the first touch electrode block and the second touch electrode block have a triangular shape, and the first touch electrode has a diamond shape.

In some embodiments, two first touch electrodes from two adjacent rows and two second touch electrodes from two adjacent first columns surround a third electrode. For example, the third electrode is surrounded by two second touch electrodes from two adjacent first columns, two first touch electrode blocks from two adjacent rows, and two second touch electrode blocks from two adjacent rows.

Accordingly, in some embodiments, the third electrode has a boundary substantially complementary to those of corresponding portions of the two first touch electrodes from two adjacent rows surrounding the third electrode. In some embodiments, the third electrode has a boundary substantially complementary to those of corresponding portions of the two second touch electrodes from two adjacent first columns surrounding the third electrode. Optionally, the third electrode has a boundary substantially complementary to those of corresponding portions of the two first touch electrodes from two adjacent rows and the two adjacent second touch electrodes from two adjacent first columns surrounding the third electrode.

A touch panel having a touch substrate described herein throughout further includes a fourth electrode group, pairing with the third electrode group as the pressure sensing electrodes for detecting an, applied pressure from a change in distance between the pair of pressure sensing electrodes due to the applied pressure. For example, the touch panel may further include an elastic layer between the third electrode group and the fourth electrode group. The elastic layer is subject to deformation in response to an applied pressure from a touch. For example, the elastic layer may be compressed in response to the applied pressure from a touch, resulting in a decreased distance between the third electrode group and the fourth electrode group. The decreased distance in turn results in a capacitance change between the third electrode group and the fourth electrode group. By detecting the capacitance change, the applied pressure may be detected. Moreover, by determining the locations of the third electrode(s) and the corresponding fourth electrode(s) that produce the capacitance change, a touch position may be determined.

In some embodiments, the fourth electrode group includes a plurality of fourth electrodes, each of which corresponding to each third electrode. Each fourth electrode and each third electrode are configured so that a sufficient capacitance change may be induced between them when the pressure is applied on the touch panel proximal to the pair of the fourth electrode and the third electrode. For example, each fourth electrode and each third electrode may be configured so that a projection of each fourth electrode at least partially overlaps with that of each third electrode in plan view of the touch substrate. Optionally, each fourth electrode has an area larger than that of each third electrode, i.e., the projection of the third electrode in plan view of the touch substrate is within the projection of the fourth electrode in plan view of the touch substrate. Optionally, each third electrode has an area larger than that of each fourth electrode, i.e., the projection of the fourth electrode in plan view of the touch substrate is within the projection of the third electrode in plan view of the touch substrate.

In some embodiments, the fourth electrode group includes a plurality of columns fourth electrodes. Optionally, each column corresponds to the second column. In some embodiments, the fourth electrode group includes a plurality of rows fourth electrodes. Optionally, each row corresponding to the row of first touch electrodes.

Any appropriate transparent electrode material may be used to make the fourth electrode group. Examples of appropriate transparent electrode materials include, but are not limited to, transparent metal (e.g., nano-silver), indium tin oxide, indium zinc oxide, and a combination thereof.

In some embodiments, the fourth electrode group is disposed in the same touch substrate as the third electrode group. Optionally, the third electrode group and the fourth electrode group are both in an array substrate. Optionally, the third electrode group and the fourth electrode group are both in a package substrate facing the array substrate.

In some embodiments, the elastic layer is disposed in a same substrate as the third electrode group, in some embodiments, the elastic layer is disposed in a same substrate as the fourth electrode group. Optionally, the elastic layer and the third electrode group are both in an array substrate. Optionally, the elastic layer and the fourth electrode group are both in a package substrate facing the array substrate.

In some embodiments, the elastic layer is disposed in the same touch substrate as the third electrode group and the fourth electrode group. Optionally, the third electrode group, the fourth electrode group, and the elastic layer are all in an array substrate. Optionally, the third electrode group, the fourth electrode group, and the elastic layer are all in a package substrate facing the array substrate.

In some embodiments, the third electrode group is disposed in the touch substrate, and the fourth electrode group is disposed in an additional touch substrate. Optionally, the touch substrate is an array substrate, and the additional touch substrate is a package substrate facing the array substrate, i.e., the third electrode group is disposed in the array substrate, and the fourth electrode group is disposed in the package substrate. Optionally, the additional touch substrate is an array substrate, and the touch substrate is a package substrate facing the array substrate, i.e., the third electrode group is disposed in the package substrate, and the fourth electrode group is disposed in the array substrate. Optionally, the elastic layer is a gap, i.e., a layer of air (e.g., the touch substrate and the additional touch substrate are frame sealed by a bonding layer in the peripheral area of the display panel. Optionally, the elastic layer is disposed in the touch substrate. Optionally, the elastic layer is disposed in the additional touch substrate. In some touch panels, the elastic layer is an optically clear resin layer, e.g., an optically clear resin layer for bonding the touch substrate and the additional touch substrate together.

Optionally, the touch panel is an in-cell touch panel. Optionally, the touch panel is an on-cell touch panel. Optionally, the touch panel is an add-on type touch panel. Optionally, the add-on type touch panel has touch electrodes embedded on a glass surface. Optionally, the add-on, type touch panel has touch electrodes embedded on a thin film. Optionally, the add-on type touch panel is a one-glass-solution type touch panel. In the one-glass-solution type touch panel, touch electrodes are integrated on a cover glass. Optionally, the add-on type touch panel is a glass-film-film type touch panel.

In some embodiments, the touch panel is an on-cell touch panel. Optionally, the touch substrate is an array substrate, and the additional touch substrate is a package substrate. Optionally, the elastic layer is an optically clear resin layer for bonding the touch substrate and the additional touch substrate:

In some embodiments, the touch panel is an in-cell touch panel. Optionally, the touch substrate is an array substrate, and the additional touch substrate is a package substrate. Optionally, the elastic layer is an optically clear resin layer, e.g., an optically clear resin layer for bonding the touch substrate and the additional touch substrate.

In some embodiments, the touch panel is an add-on touch panel (e.g., a one-glass-solution type touch panel or a glass-film-film type touch panel). Optionally, the touch substrate is a package substrate, and the additional touch substrate is an array substrate. Optionally, the elastic layer is an optically clear resin layer, e.g., an optically clear resin layer for bonding the touch substrate and the additional touch substrate.

In another aspect, the present disclosure provides a method of fabricating a touch substrate or a touch panel. In some embodiments, the method includes forming a first touch electrode group having a plurality of rows of first touch electrodes; forming a second touch electrode group having a plurality of first columns of second touch electrodes; and forming a third electrode group having a plurality of second columns of third electrodes. The first touch electrodes in each row are formed to be spaced apart from each other along a row direction. The second touch electrodes in each first column are formed to be spaced apart from each other along a first column direction. The third electrodes in second column are formed to be spaced apart from each other along a second column direction. The plurality of rows of first touch electrodes cross over the plurality of first columns of second touch electrodes forming a plurality of first intersections. The plurality of rows of first touch electrodes cross over the plurality of second columns of third electrodes forming a plurality of second intersections. Specifically, two first touch electrodes from two adjacent rows and two second touch electrodes from two adjacent first columns are formed to surround a third electrode.

In some embodiments, the first touch electrode group, the second touch electrode group, and the third electrode group are formed in a same layer. Optionally, the first touch electrode group, the second touch electrode group and the third electrode group are formed in two or more layers. For examples, the third electrode group may be formed in a first layer, and the first touch electrode group and the second touch electrode group may be formed in a second layer, the first layer being different from the second layer. Optionally, the first touch electrode group, the second touch electrode group and the third electrode group are formed in three different layers.

In some embodiments, the method further includes forming a fourth electrode group having a plurality of fourth electrodes. Optionally, each fourth electrode corresponds to each third electrode. Optionally, a projection of each fourth electrode at least partially overlaps with that of each third electrode in plan view of the touch panel. Optionally, the third electrode group and the fourth electrode group are formed in a same touch substrate, e.g., an array substrate or a package substrate. Optionally, the third electrode group and the fourth electrode group are formed in two different substrates selected from a touch substrate and an additional touch substrate facing the touch substrate, respectively. For example, the third electrode group and the fourth electrode group may be both formed in an array substrate. Optionally, the third electrode group and the fourth electrode group are both formed in a package substrate.

In some embodiments, the fourth electrode group is formed in the same touch substrate as the third electrode group. Optionally, the third electrode group and the fourth electrode group are both formed in an array substrate. Optionally, the third electrode group and the fourth electrode group are both formed in a package substrate a the array substrate.

In some embodiments, the method further includes forming an elastic layer between the third electrode group and the fourth electrode group; the elastic layer configured to deform in response to a pressure from a touch. In some embodiments, the elastic layer is formed in a same substrate as the third electrode group. In some embodiments, file elastic layer is formed in a same substrate as the fourth electrode group. Optionally, the elastic layer and the third electrode group are both formed in an array substrate. Optionally, the elastic layer and the fourth electrode group are both formed in a package substrate facing the array substrate.

In some embodiments, the elastic layer is formed same touch substrate as the third electrode group and the fourth electrode group. Optionally, the third electrode group, the fourth electrode group, and the elastic layer are all formed in an array substrate. Optionally, the third electrode group, the fourth electrode group, and the elastic layer are all formed in a package substrate facing the array substrate.

In some embodiments, the third electrode group is formed in the touch substrate, and the fourth electrode group is disposed in an additional touch substrate. Optionally, the touch substrate is an array substrate, and the additional touch substrate is a package substrate facing the array substrate, the third electrode group is formed in the array substrate, and the fourth electrode group is formed in the package substrate. Optionally, the additional touch substrate is an array substrate, and the touch substrate is a package substrate facing the array substrate, i.e., the third electrode group is formed in the package substrate, and the fourth electrode group is formed in the array substrate. Optionally, elastic layer is formed in the touch substrate. Optionally, the elastic layer is formed in the additional touch substrate. In some touch panels, the elastic layer is an optically clear resin layer, e.g., an optically clear resin layer for bonding the touch substrate and the additional touch substrate together. Optionally, the elastic layer is a gap, i.e., a layer of air. Optionally, the method includes forming a bonding layer in the peripheral area of the display panel, and frame sealing touch substrate and the additional touch substrate together using the bonding layer.

In some embodiments, the method further includes forming a first bridge layer including a plurality of rows of first bridges; forming a second bridge layer including a plurality of first columns of second bridges; and forming a third bridge layer including a plurality of second columns of third bridges. Optionally, the method further includes electrically connecting two adjacent first touch electrodes along the row direction at each first intersection using a first bridge. Optionally, the method further includes electrically connecting two adjacent second touch electrodes along the first column direction at each first intersection using a second bridge. Optionally, the method further includes electrically connecting two adjacent third electrodes along the second column direction at each second intersection using a third bridge.

In some embodiments, the method further includes forming a fourth bridge layer having a plurality of rows of fourth bridges. Optionally, the step of forming the first touch electrode group includes forming a plurality of first touch electrode blocks and a plurality of second touch electrode blocks. Each first touch electrode is formed to include a first touch electrode block and a second touch electrode block. Optionally, the method further includes electrically connecting adjacent first touch electrode block and second touch electrode block along the row direction at each first intersection using a first bridge. Optionally, the method further includes electrically connecting adjacent first touch electrode block and second touch electrode block along the row direction at each second intersection using a fourth bridge.

In some embodiments, the third bridge electrically connecting die two adjacent third electrodes along the second column direction is formed to space apart, and be insulated from, the adjacent first touch electrode block and second touch electrode block electrically connected through the fourth bridge at a second intersection. In some embodiments, the adjacent first touch electrode block and second touch electrode block along the row direction are formed to be spaced apart at each second intersection to form a passage between the adjacent first touch electrode block and second touch electrode block for allowing a third bridge extending through the passage and insulated from the adjacent first touch electrode block and second touch electrode block. The spaced-apart, adjacent first touch electrode block and second touch electrode block along the row direction are electrically connected through one or more fourth bridge.

In some embodiments, the third electrode is formed to have a boundary substantially complementary to at least one corresponding portions of the two first touch electrodes from two adjacent rows and the two second touch electrodes from two adjacent first columns surrounding the third electrode. Optionally, the third electrode is formed to have a boundary substantially complementary to those of corresponding portions of the two first touch electrodes from two adjacent rows surrounding the third electrode. Optionally, the third electrode is formed to have a boundary substantially complementary to those of corresponding portions of the two second touch electrodes from two adjacent first columns surrounding the third electrode. Optionally, the third electrode is formed to have a boundary substantially complementary to those of corresponding portions of the two first touch electrodes from two adjacent rows and the two adjacent second touch electrodes from two adjacent first columns surrounding the third electrode.

FIG. 1A is a diagram illustrating the structure of a touch substrate in some embodiments. Referring to FIG. 1A, the touch substrate in the embodiment includes a first touch electrode group A, a second touch electrode group B, and a third electrode group C. As shown in FIG. 1A, the first touch electrode group A includes a plurality of rows of first touch electrodes 1, the second touch electrode group B includes a plurality of first columns of second touch electrodes 2, and the third electrode group C includes a plurality of second columns of third electrodes 3. Each first touch electrode 1 includes a first touch electrode block 1a and a second touch electrode block 1b. For example, the first touch electrode group A includes a plurality of first touch electrode blocks 1a and a plurality of second touch electrode blocks 1b alternately arranged along the row direction.

The first column and the second column optionally are substantially parallel to each other. An adjacent first column of second touch electrodes 2 and an adjacent second column of third electrodes 3 are spaced apart, e.g., by first touch electrode blocks 1a or second touch electrode blocks 1b.

Various ratios between the number of third electrodes 3 and the number of first touch electrodes 1 or second touch electrodes 2 may be used. Optionally, the number of third electrodes 3 is substantially the same as the number of the first touch electrodes 1. Optionally, the number of third electrodes 3 is substantially the same as the number of the second touch electrodes 2. Optionally, the number of third electrodes 3 is about half that of the second touch electrodes 2. For examples, the number of second columns is about half that of the first columns. Alternatively, the number of third electrodes 3 in each second column may be about half that of the second touch electrodes 2 in each first column. Depending on design needs, the number of third electrodes in a certain area of the touch substrate may be selected to provide a pressure sensor density sufficient to detect an applied pressure from a touch finger or palm. Optionally, the ratio among the number of first touch electrodes 1, the number of second touch electrodes 2, and the number of third electrodes 3 may be in the range of 1:1:1 to 10:10:1, e.g., 1:1:1, 2:2:1, 3:3:1, 4:4:1, 6:6:1, etc.

In some embodiments, the third electrode group is a single electrode layer including a plurality of third electrode for detecting an applied pressure, i.e., the single electrode layer itself is sufficient to detect the applied pressure. For example, the third electrode may be an electrode capable of undergoing restorable deformation in response to an applied pressure from a touch. Capacitance between adjacent third electrode blocks in a same layer is formed by fringe effect. When a touch occurs, one or more third electrode undergoes deformation in response to the pressure applied by the touch. The third electrode group is configured so that capacitance between the deformed third electrode and adjacent third electrode block decreases with increasing pressure applied to the surface of the touch panel. Optionally, the third electrode group is disposed on an elastic layer. Optionally, the third electrode itself is elastic. The single electrode layer may be made by any appropriate electrode material, including transparent or non-transparent electrode materials. Optionally, the third electrode group is made of a transparent material. Examples of appropriate electrode materials for making the third electrode group include, but are not limited to, nano-silver, graphene. Various alternative embodiments may be practiced to make a single layer pressure sensing electrodes.

Figure 1B:
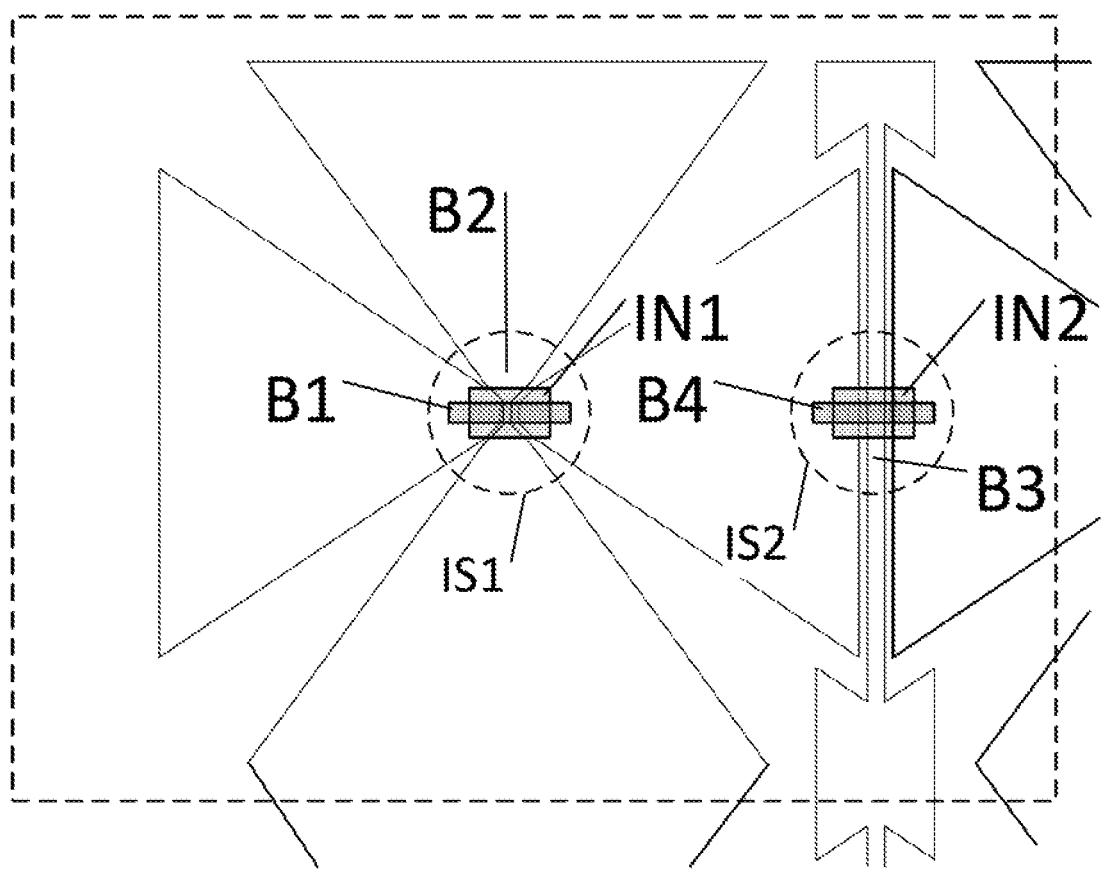
FIG. 1B is a zoom-in view of the dotted area in FIG. 1A.

FIG. 1B is a zoom-in view of the dotted area in FIG. 1A. Referring to FIG. 1B, the touch substrate further includes a first bridge layer having a plurality of rows of first bridges B1, a second bridge layer having a plurality of first columns of second bridges B2, a third bridge layer having a plurality of second columns of third bridges B3, and a fourth bridge layer having a plurality of rows of fourth bridges B4. A first bridge B1 and a second bridge 132 cross over each other forming a first intersection IS1. A fourth bridge B4 and a third bridge B3 cross over each other forming a second intersection IS2.

Referring to FIG. 1B, the touch substrate in the embodiment further includes a first insulating layer having a plurality of first insulating block IN1, and a second insulating layer having a plurality of second insulating block IN2. A first bridge B1 and a second bridge B2 are insulated by a first insulating block IN1. A fourth bridge B4 and a third bridge B3 are insulated by a second insulating block IN2. Optionally, the first insulating layer and the second insulating layer are in a same layer.

Referring to FIGS. 1A and 1B, first touch electrodes 1 in each row are spaced apart from each other along the row direction, and are electrically connected to each other through a plurality of first bridges B1 and a plurality of fourth bridges B4. Specifically, first touch electrode blocks 1a and second touch electrode blocks 1b along the row direction are alternately arranged and spaced apart from each other, a pair of adjacent first touch electrode block 1a and second touch electrode block 1b along the row direction are electrically connected at a first intersection IS1 through a first bridge B1, and a pair of adjacent first touch electrode block 1a and second touch electrode block 1b along the row direction are electrically connected at a second intersection IS2 through a fourth bridge B4.

Optionally, a plurality of first intersections IS1 and a plurality of second intersections IS2 may be arranged along a same row direction (e.g., along a same line). For example, the plurality of first bridges B1 and the plurality of fourth bridges B4 may be arranged to form a single line along the row direction. Optionally, a plurality of first intersections IS1 and a plurality of second intersections IS2 may be arranged along two row directions, respectively, e.g., a first row direction and a second row direction. For examples, the plurality of first bridges B1 and the plurality of fourth bridges B4 may be arranged to form two separate lines along the first row direction and the second row direction, respectively.

As shown in FIGS. 1A and 1B second touch electrodes 2 in each first column are spaced apart from each other along a first column direction, and are electrically connected at each first intersection IS1 through a second bridge B2. Each row of first touch electrodes 1 crosses over each first column of second touch electrodes 2 forming a first intersection IS1, e.g., each first bridge B1 crosses over each second bridge B2 forming a first intersection IS1. Similarly, third electrodes 3 in each second column are spaced apart from each other along a second column direction, and are electrically connected at each second intersection IS2 through a third bridge B3. Each row of first touch electrodes 1 crosses over each second column of third electrodes 3 forming a second intersection IS2, e.g., each fourth bridge B4 crosses over each third bridge B3 forming a second intersection IS2.

In some embodiments, two first touch electrodes 1 (each including a first touch electrode block 1a and a second touch electrode block 1b) from two adjacent rows and two second touch electrodes 2 from two adjacent first columns surround a third electrode 3. Optionally, the third electrode 3 has a shape substantially complementary to those of surrounding electrodes. For examples, the third electrode 3 may have a boundary substantially complementary to those of corresponding portions of the two first touch electrodes 1 from two adjacent rows surrounding the third electrode 3 (see, e.g., FIG. 1A). Optionally, the third electrode 3 may have a boundary substantially complementary to those of corresponding portions of the two second touch electrodes 2 from two adjacent first columns surrounding the third electrode 3. Optionally, the third electrode 3 has a boundary substantially complementary to those of corresponding portions of the two first touch electrodes 1 from two adjacent rows and the two second touch electrodes 2 from two adjacent first columns surrounding the third electrode 3.

The third bridge B3 may have various appropriate shapes. For example, the third bridge B3 may have a rod shape as shown in FIG. 1B. The third bridge B3 electrically connecting two adjacent third electrodes 3 along the second column direction spaces apart, and is insulated from, a pair of adjacent first touch electrode block 1a and second touch electrode block 1b connected through the fourth bridge B4 at a second intersection IS2. Thus, the pair of adjacent first touch electrode block 1a and second touch electrode block 1b are spaced apart to form a passage between the adjacent first touch electrode block 1a and second touch electrode block 1b, allowing a third bridge B3 extending through the passage. The third bridge B3 is insulated from the adjacent first touch electrode block 1a and second touch electrode block 1b. The adjacent first touch electrode block 1a and second touch electrode block 1b may be connected through a fourth bridge B4. Optionally, the third bridge B3 is in a same layer as the adjacent first touch electrode block 1a and second touch electrode block 1b, and the fourth bridge B4 is in a different layer. Optionally, the fourth bridge B4 is in a same layer as the adjacent first touch electrode block 1a and second touch electrode block 1b, and the third bridge B3 is in a different layer.

Figure 2A:
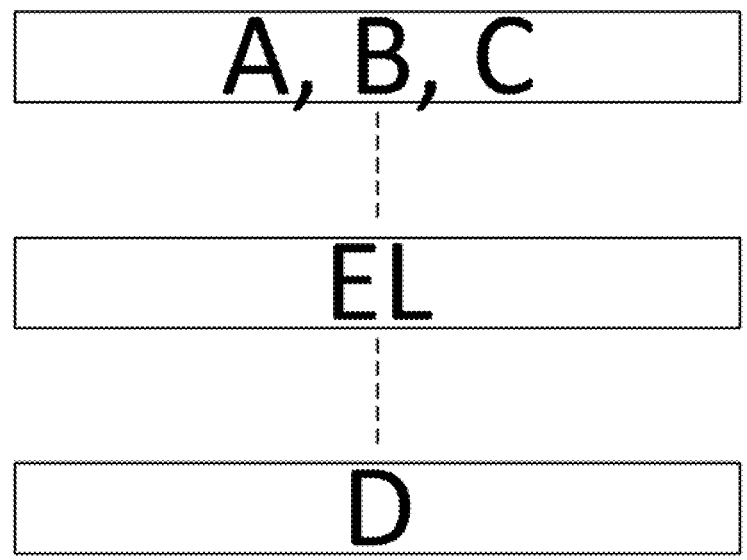
FIG. 2A is a diagram illustrating the structure of a display panel in some embodiments.

FIG. 2A is a diagram illustrating the structure of a display panel in some embodiments. Referring to FIG. 2A, the display panel in the embodiments includes a fourth electrode group D, an elastic layer EL on the fourth electrode group D, and a third electrode group C on a side of the elastic layer EL distal to the fourth electrode group D, i.e., the elastic layer EL is between the fourth electrode group D and the third electrode group C. Optionally, as shown in FIG. 2A, the first touch electrode group A and the second touch electrode group are also on a side of the elastic layer EL distal to the fourth electrode group D. Optionally, the first touch electrode group A, the second touch electrode group B, and the third electrode group C are all in a same layer. Optionally, at least one of the first touch electrode group A, the second touch electrode group B, and the third electrode group C is in a different layer from the other two. Optionally, the first touch, electrode group A, the second touch electrode group B, and the third electrode group C are in three different layers.

The elastic layer may be made of any appropriate elastic material that is capable of temporarily undergoing deformation in response to an applied pressure from a touch, and is capable of restoring its thickness when the applied pressure is discontinued. Examples of appropriate elastic materials include, but are not limited to, an optically clear resin, an optically clear adhesive, and an optically clear rubber.

Figure 2B:
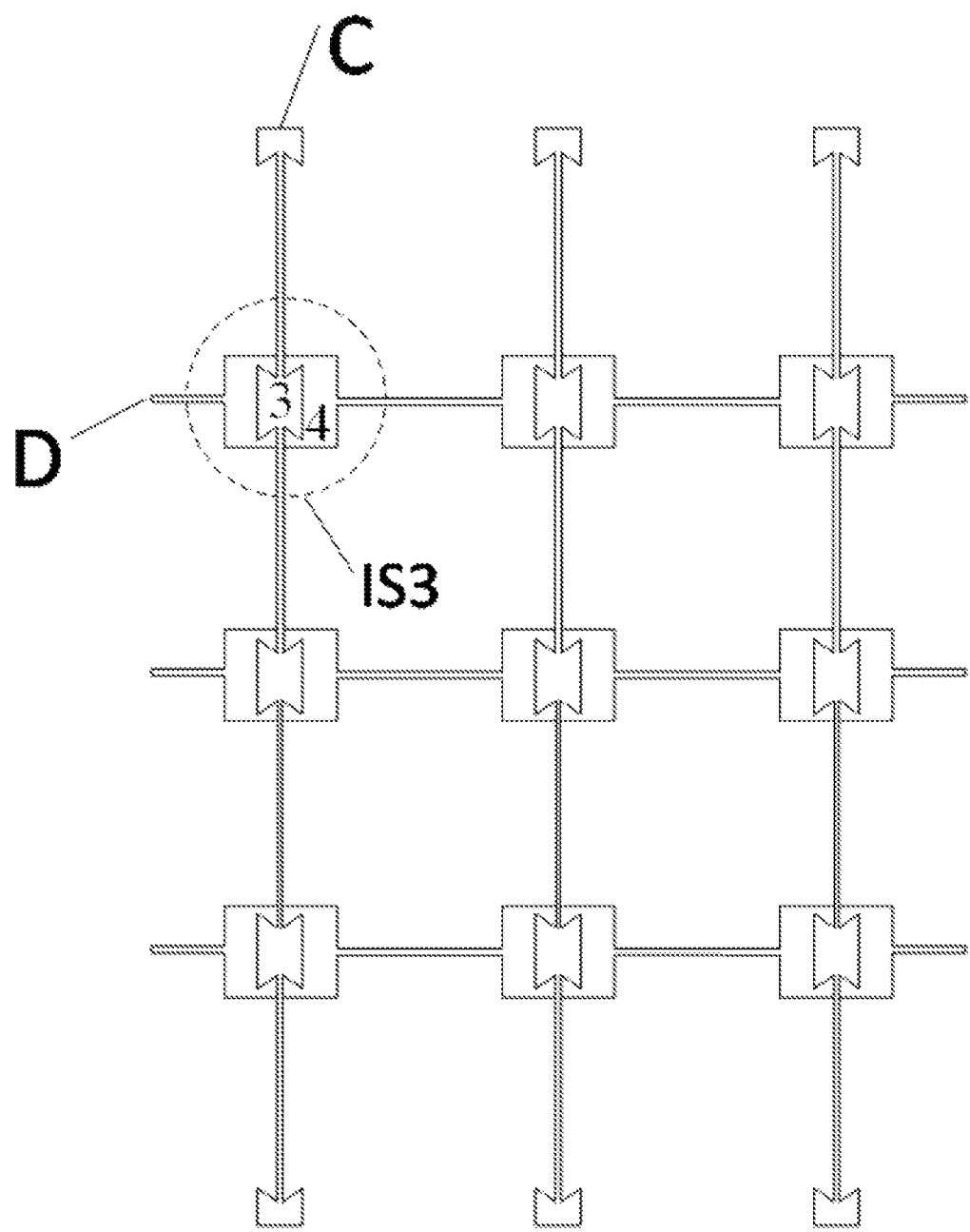
FIG. 2B is a diagram illustrating the structure of pressure sensing electrodes in some embodiments.

FIG. 2B is a diagram illustrating the structure of pressure sensing electrodes in some embodiments. Referring to FIG. 2B, the third electrode group C and the fourth electrode group D are shown in plan view of the display panel. As shown in FIG. 2B, a fourth electrode 4 corresponds to a third electrode 3, e.g., in a one-to-one relationship. The pair of fourth electrode 4 and third electrode 3 is a pair of pressure sensing electrodes for detecting an applied pressure from a change in distance between the pair of pressure sensing electrodes due to the applied pressure. The changed distance between the pair of pressure sensing electrodes induces a capacitance change between the third electrode group C and the fourth electrode group D.

In order to detect the changed capacitance between the pressure sensing electrode pair with a higher sensitivity, the projections of the pressure sensing electrode pair optionally at least partially overlap with each other in plan view of the display panel. The touch panel further includes a touch control circuit board electrically connected to the touch electrode groups A and B and pressure sensing electrode groups C and D. The touch control circuit board detects the touch signals from the touch electrode groups A and B and pressure signals from the pressure sensing electrode groups C and D. The touch position may be determined based on the touch signals from the touch electrode groups A and B, and the pressure applied by the touch may be determined based on the pressure signals from the pressure sensing electrode groups C and D. Optionally, the touch position may also be determined based on the signals from the pressure sensing electrode groups C and D.

Figure 2C:
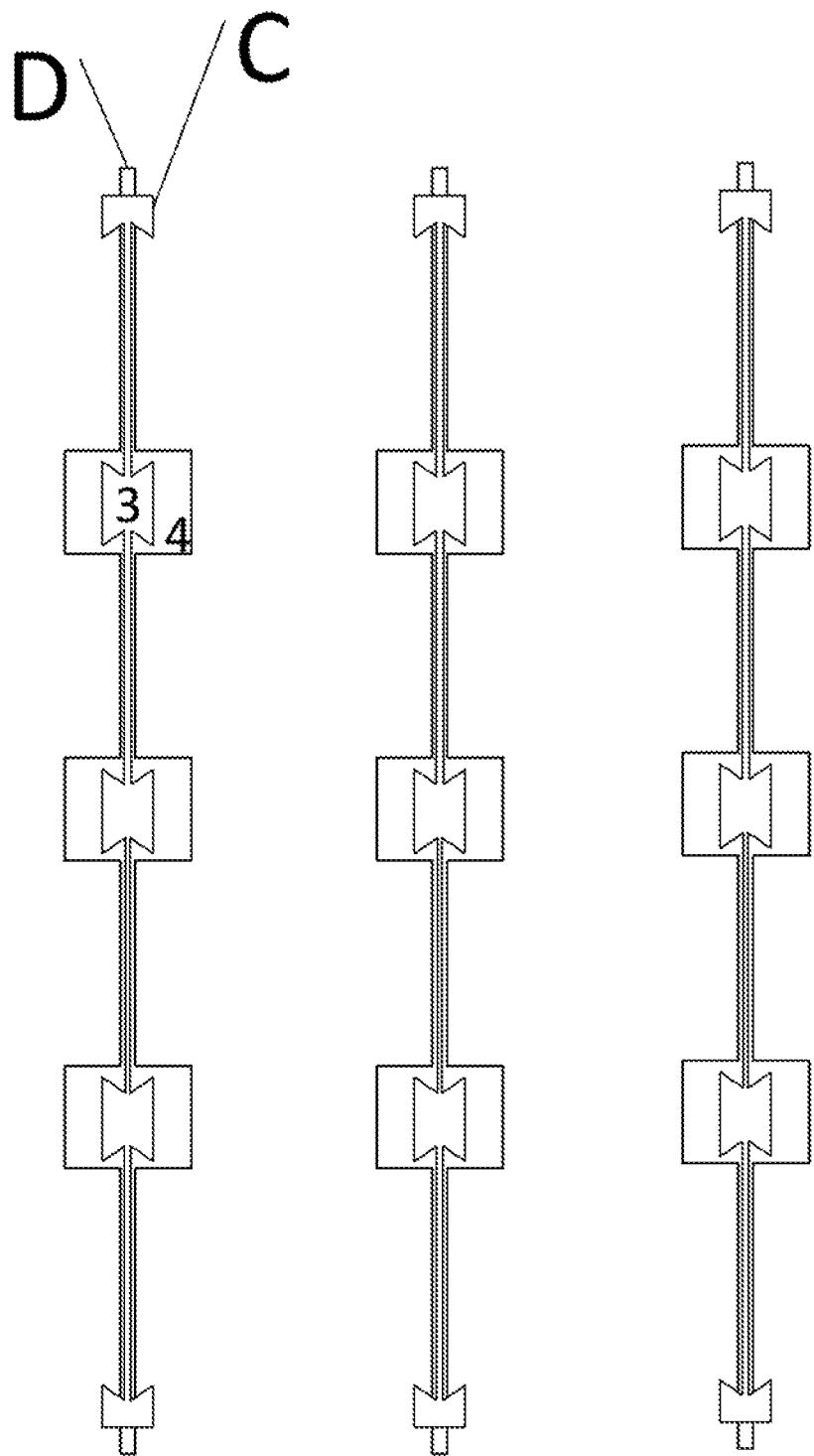
FIG. 2C is a diagram illustrating the structure of pressure sensing electrodes in some embodiments.

As shown in FIG. 2B, the fourth electrode group D includes a plurality of rows of fourth electrodes 4. The projection of the plurality of rows of fourth electrodes 4 and the projection of the plurality of second columns of third electrodes 3 form a plurality of third intersection IS3. Alternatively, as shown in FIG. 2C, the fourth electrode group D may include a plurality of columns of fourth electrodes 4. The fourth electrode 4 in FIG. 28 has an area larger than that of the third electrode 3. Optionally, the third electrode 3 may have an area larger than that of the fourth electrode 4. Optionally, the third electrode 3 and the fourth electrode 4 may have a same area. The fourth electrode group D further includes a plurality of fifth bridges connecting the fourth electrodes 4 in each row or each column.

In some embodiments, the touch panel includes a touch substrate and an additional touch substrate. Optionally, the third electrode group C, the fourth electrode group D, and the elastic layer are disposed in the touch substrate. Optionally, the third electrode group C is in the touch substrate and the fourth electrode group D is in the additional touch substrate. Optionally, the fourth electrode group D is in the touch substrate and the thin electrode group C is in the additional touch substrate. Optionally, the elastic layer is in the same layer as the third electrode group C. Optionally, the elastic layer is in the same layer as the fourth electrode group D.

Figure 2D:
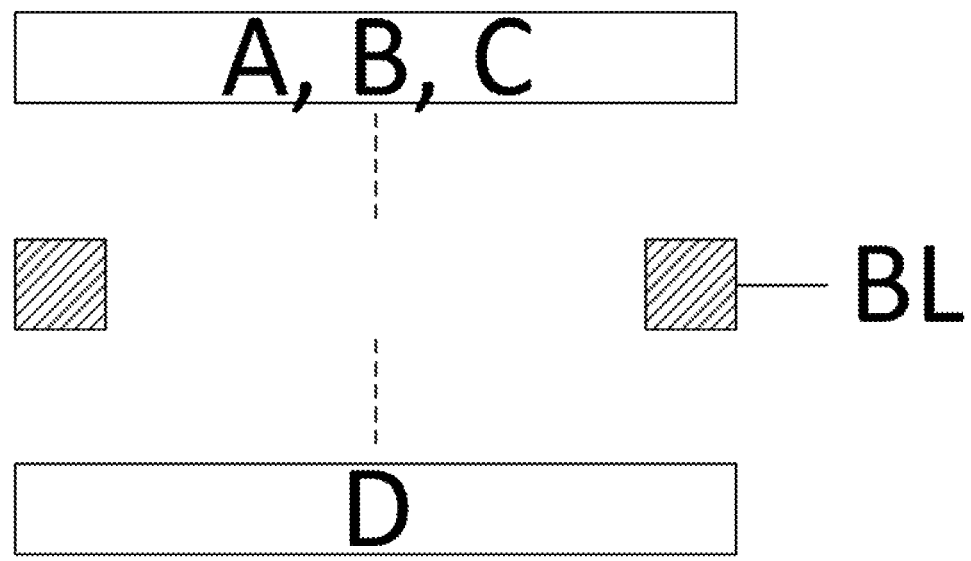
FIG. 2D is a diagram illustrating the structure of a display panel in some embodiments.

FIG. 2D is a diagram illustrating the structure of a display panel in some embodiments. Referring to FIG. 2D, the display panel in the embodiments includes a fourth electrode group D, a bonding layer BL on the fourth electrode group D, and a third electrode group C on a side of the bonding layer BL distal to the fourth electrode group D, i.e., the bonding layer BL is between the fourth electrode group D and the third electrode group C. Optionally, as shown in FIG. 2D, the first touch electrode group A and the second touch electrode group B are also on a side of the bonding layer BL distal to the fourth electrode group D. Optionally, the first touch electrode group A, the second touch electrode group 8, and the third electrode group C are all in a same layer. Optionally, at least one of the first touch electrode group A, the second touch electrode group R. and the third electrode group C in a different layer from the other two. Optionally, the first touch electrode group A, the second touch electrode group B, and the third electrode group C are in three different layers.

Figure 3A:
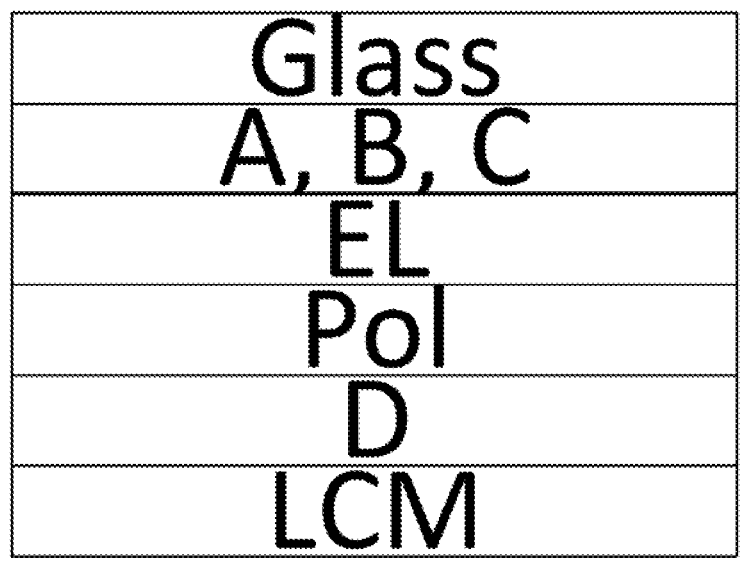
FIG. 3A is a diagram illustrating the structure of a touch panel in some embodiments.

FIG. 3A is a diagram illustrating the structure of a touch panel in some embodiments. Referring to FIG. 3A, the touch panel in the embodiment is a one-glass-solution type liquid crystal touch panel. The touch panel in the embodiment includes a liquid crystal module LCM; a fourth electrode group D on the liquid crystal module LCM; a polarizer layer Pol on a side of the fourth electrode group D distal to the liquid crystal module LCM; an elastic layer EL on a side of the polarizer layer Pol distal to the fourth electrode group D; as well as a first touch electrode group A, a second touch electrode group B, and a third electrode group C on a side of the elastic layer EL distal to the polarizer layer Pol. The touch panel may further include a cover glass on a side of the first touch electrode group A, the second touch electrode group B, and the third electrode group C distal to the elastic layer EL. Optionally, the elastic layer EL is an optically clear resin layer for bonding the touch panel.

Figure 3B:
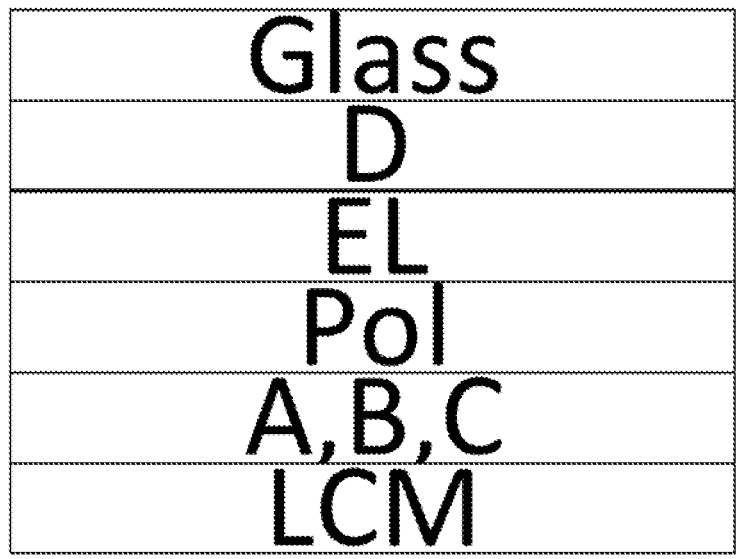
FIG. 3B is a diagram illustrating the structure of a touch panel in some embodiments.

FIG. 3B is a diagram illustrating the structure of a touch panel in some embodiments. Referring to FIG. 3B, the touch panel in the embodiment is an on-cell liquid crystal touch panel. The touch panel in the embodiment includes a liquid crystal module LCM; a first touch electrode group A, a second touch electrode group B, and a third electrode group C on the liquid crystal module LCM; a polarizer layer Pol on a side of the first touch, electrode group A, the second touch electrode group B, and the third electrode group C distal to the liquid crystal module LCM; an elastic layer EL on a side of the polarizer layer Pol distal to the first touch electrode group A, the second touch electrode group B, and the third electrode group C; as well as a fourth electrode group D on a side of the elastic layer EL distal to the polarizer layer Pol. The touch panel may further include a cover glass on a side of the fourth electrode group D distal to the elastic layer EL. Optionally, the elastic layer EL is an optically clear resin layer for bonding the touch panel.

Figure 3C:
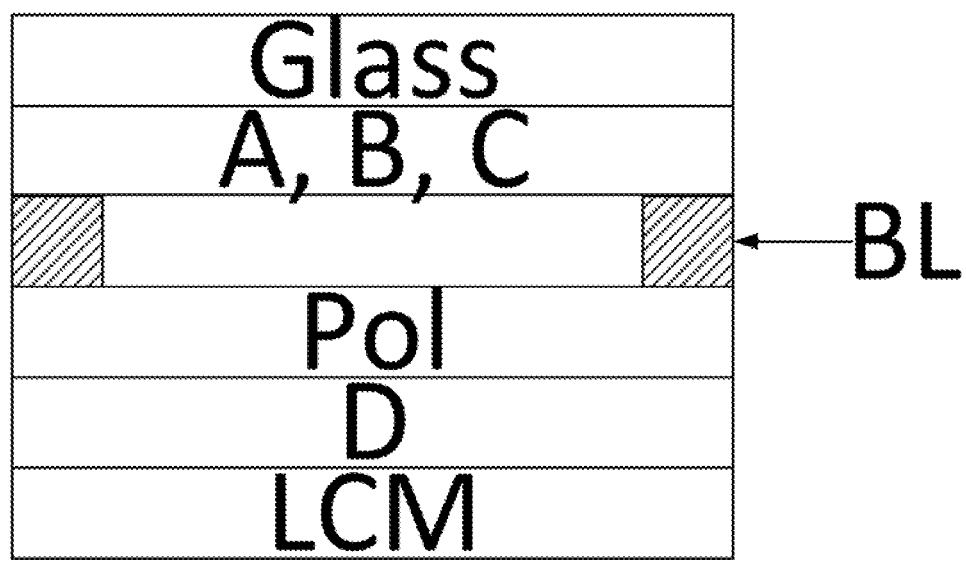
FIG. 3C is a diagram illustrating the structure of a touch panel in some embodiments.

FIG. 3C is a diagram illustrating the structure of a touch panel in some embodiments. Referring to FIG. 3C, the touch panel in the embodiment is a one-glass-solution type liquid crystal touch panel. The touch panel in the embodiment includes a liquid crystal module LCM; a fourth electrode group D on the liquid crystal module LCM; a polarizer layer Pol on a side of the fourth electrode group D distal to the liquid crystal module LCM; a bonding layer BL on a side of the polarizer layer Pol distal to the fourth electrode group D; as well as a first touch electrode group A, a second touch electrode group B, and a third electrode group C on a side of the bonding layer BL distal to the polarizer layer Pol. The touch panel may further include a cover glass on a side of the first (ouch electrode group A, the second touch electrode group B, and the third electrode group C distal to the bonding layer BL. Optionally, the bonding layer BL is an adhesive layer for framing sealing the touch panel.

In another aspect, the present disclosure provides a method of fabricating a touch substrate. FIG. 4 is a flow chart illustrating a method of fabricating a touch panel in some embodiments. Referring to FIG. 4, the method in the embodiment includes forming a first touch electrode group including a plurality of rows of first touch electrodes; each first touch electrode including a first touch electrode block and a second touch electrode block; first touch electrodes in each row are formed to be spaced apart from each other along a row direction; forming a second touch electrode group including a plurality of first columns of second touch electrodes; second touch electrodes in each first column are formed to be spaced apart from each other along a first column direction; the plurality of rows of first touch electrodes crossing over the plurality of first columns of second touch electrodes forming a plurality of first intersections; forming a third electrode group including a plurality of second columns of third electrodes; third electrodes in second column are formed to be spaced apart from each other along a second column direction; the plurality of rows of first touch electrodes crossing over the plurality of second columns of third electrodes forming a plurality of second intersections; forming a first bridge layer including a plurality of rows of first bridges; adjacent first touch electrode block and second touch electrode block along the row direction are electrically connected at each first intersection through a first bridge; forming a second bridge layer including a plurality of first columns of second bridges; two adjacent second touch electrodes along the first column direction are electrically connected at each first intersection through a second bridge; forming a third bridge layer including a plurality of second columns of third bridges; two adjacent third electrodes along the second column direction are electrically connected at each second intersection through a third bridge; and forming a fourth bridge layer including a plurality of rows of fourth bridges; adjacent first touch electrode block and second touch electrode block along the row direction are electrically connected at each second intersection through a fourth bridge.

In another aspect, the present disclosure provides a method of fabricating a one-glass-solution touch panel having an array substrate and a package substrate. In some embodiment, the method includes forming a first touch electrode group, a second touch electrode group, and a third electrode group on the package substrate. Optionally, the step of forming the first touch electrode group, the second touch electrode group, and the third electrode group on the package substrate includes depositing a transparent electrode material layer on the package substrate, depositing, a photoresist layer on the transparent electrode material layer, exposing the photoresist layer with a mask plate; and developing the exposed photoresist layer to obtain a pattern corresponding to the first touch electrode group, the second touch electrode group, and the third electrode group. Optionally, the pattern includes a passage between a pair of adjacent first touch electrode block and second touch electrode block for allowing a third bridge extending through the passage.

In some embodiment, the second bridge layer and the third bridge layer are in a same layer as the first touch electrode group, the second touch electrode group, and the third electrode group. Optionally, the method includes forming the second bridge layer and the third bridge layer in a snare process as the step of forming the first touch electrode group, the second touch electrode group, and the third electrode group.

The method further includes forming an insulating layer on the first touch electrode group, the second touch electrode group, and the third electrode group. Optionally, the step of forming the insulating layer includes depositing an insulating material layer on the package substrate, depositing a photoresist layer on the insulating material layer, exposing the photoresist layer with a mask plate, and developing the exposed photoresist layer to obtain a pattern corresponding to the insulating layer. Optionally, the insulating layer includes a first insulating layer and a second insulating layer. The first insulating layer insulates the first bridge layer from the second bridge layer. The second insulating layer insulates the fourth bridge layer from the third bridge layer.

In some embodiments, the method further includes forming a first bridge layer and a fourth bridge layer on a side of the insulating layer distal to the first touch electrode group, the second touch electrode group, and the third electrode group. Optionally, the step of forming the first bridge layer and the fourth bridge layer includes depositing a metal material layer on the package substrate, depositing a photoresist layer on the metal material layer, exposing the photoresist layer with a mask plate; and developing the exposed photoresist layer to obtain a pattern corresponding to the first bridge layer and the fourth bridge layer.

In some embodiments, the first touch electrode group, the second touch electrode group, and the third electrode group are formed on a side of the insulating layer proximal to the package substrate, and the first bridge layer and the fourth bridge layer are formed on a side of the insulating layer distal to the package substrate. Optionally, the first touch electrode group, the second touch electrode group, and the third electrode group are formed prior to the formation of the insulating layer, and the insulating layer is formed prior to the formation of the first bridge layer and the fourth bridge layer. In some embodiments, the first bridge layer and the fourth bridge layer are formed on a side of the insulating layer proximal to the package substrate; and the first touch electrode group, the second touch electrode group, and the third, electrode group are formed on a side of the insulating layer distal to the package substrate. Optionally, the first bridge layer and the fourth bridge layer are formed prior to the formation of the insulating layer, and the insulating layer is formed prior to the formation of the first touch electrode group, the second touch electrode group, and the third electrode group.

The method further includes forming a fourth electrode group on an array substrate. When the touch panel is a liquid crystal touch panel, the fourth electrode group may be formed on a side of a polarizer layer proximal to a liquid crystal module. Optionally, the fourth electrode group may be formed on a side of a polarizer layer distal to a liquid crystal module. The fourth electrode group includes a plurality of fourth electrodes; each fourth electrode corresponding to each third electrode. A projection of each fourth electrode at least partially overlaps with that of each third electrode in plan view of the touch panel.

The method may further include forming an elastic layer between the third electrode group and the fourth electrode group. The elastic layer configured to deform in response to a pressure from a touch. Optionally, the elastic layer is an optically clear resin layer for adhering the array substrate and the package substrate together. Optionally, the elastic layer may be a layer in the array substrate on a side of the fourth electrode group proximal to the package substrate. Optionally, the elastic layer may be a layer in the package substrate on a side of the third electrode group proximal to the array substrate.

The method may further include forming a bonding layer between the third electrode group and the fourth electrode group for frame sealing the third electrode group and the fourth electrode group together. Optionally, the bonding layer is an adhesive layer in the peripheral area of the third electrode group and the fourth electrode group.

Optionally, the method includes forming both an elastic layer and a bonding layer between the third electrode group and the fourth electrode group.

In another aspect, the present disclosure provides a method of fabricating an on-cell touch panel having an array substrate and a package substrate. In some embodiments, the method includes forming a first touch electrode group, a second touch electrode group, and a third electrode group on the array substrate. For example, the first touch electrode group, the second touch electrode group, and the third electrode group may be formed on a side of a polarizer layer proximal to the liquid crystal module. Optionally, the first touch electrode group, the second touch electrode group, and the third electrode group are formed on a side of the polarizer layer distal to the liquid crystal module.

In some embodiments, the method includes forming a black matrix layer on the liquid crystal module; and forming a first touch electrode group, a second touch electrode group, and a third electrode group on the black matrix layer. Optionally, the step of forming the first touch electrode group, the second touch electrode group, and the third electrode group on the array substrate includes depositing a transparent electrode material layer on the array substrate, depositing a photoresist layer on the transparent electrode material layer, exposing the photoresist layer with a mask plate; and developing the exposed photoresist layer to obtain a pattern corresponding to the first touch electrode group, the second touch electrode group, and the third electrode group. Optionally, the pattern includes a passage between a pair of adjacent first touch electrode block and second touch electrode block for allowing a third bridge extending through the passage.

In some embodiment, the second bridge layer and the third bridge layer are in a same layer as the first touch electrode group, the second touch electrode group, and the third electrode group. Optionally, the method includes forming the second bridge layer and the third bridge layer in a same process as the step of forming the first touch electrode group, the second touch electrode group, and the third electrode group.

The method further includes forming an insulating layer on the first touch electrode group, the second touch electrode group, and the third electrode group. Optionally, the step of forming the insulating layer includes depositing a photoresist insulating material layer on the package substrate, exposing the photoresist insulating material layer with a mask plate, and developing the exposed photoresist insulating material layer to obtain a pattern corresponding to the insulating layer. Optionally, the insulating layer includes a first insulating layer and a second insulating layer. The first insulating layer insulates the first bridge layer from the second bridge layer. The second insulating layer insulates the fourth bridge layer from the third bridge layer.

In some embodiments, the method further includes forming a first bridge layer and a fourth bridge layer on a side of the insulating layer distal to the first touch electrode group, the second touch electrode group, and the third electrode group. Optionally, the step of forming the first bridge layer and the fourth bridge layer includes depositing a metal material layer on the package substrate, depositing a photoresist layer on the metal material layer, exposing the photoresist layer with a mask plate; and, developing the exposed photoresist layer to obtain a pattern corresponding to the first bridge layer and the fourth bridge layer.

In some embodiments, the first touch electrode group, the second touch electrode group, and the third electrode group are formed on a side of the insulating layer proximal to the array substrate, and the first bridge layer and the fourth bridge layer are formed on a side of the insulating layer distal to the array substrate. Optionally, the first touch electrode group, the second touch electrode group, and the third electrode group are formed prior to the formation of the insulating layer, and the insulating layer is formed prior to the formation of the first bridge layer and the fourth bridge layer. In some embodiments, the first bridge layer and the fourth bridge layer are formed on a side of the insulating layer proximal to the array substrate; and the first touch electrode group, the second touch electrode group, and the third electrode group are thrilled on a side of the insulating layer distal to the array substrate. Optionally, the first bridge layer and the fourth bridge layer are formed prior to the formation of the insulating layer, and the insulating layer is formed prior to the formation of the first touch electrode group, the second touch electrode group, and the third electrode group.

The method further includes forming a fourth electrode group on a package substrate (e.g., a color filter substrate) facing the array substrate. The fourth electrode group includes a plurality of fourth electrodes; each fourth electrode corresponding to each third electrode. A projection of each fourth electrode at least partially overlaps with that of each third electrode in plan view of the touch panel.

The method further includes forming an elastic layer between the third electrode group and the fourth electrode group; the elastic layer configured to deform in response to a pressure from a touch. Optionally, the elastic layer is an optically clear resin layer for adhering the array substrate and the package substrate together. Optionally, the elastic layer may be a layer in the array substrate on a side of the third electrode group proximal to the package substrate. Optionally, the elastic, layer may be a layer in the package substrate on a side of the fourth electrode group proximal to the array substrate.

In another aspect, the present disclosure provides a touch apparatus (e.g., a touch display apparatus) having a touch panel described herein. Examples of appropriate touch apparatuses include, but are not limited to, a liquid crystal display panel, an organic light emitting display panel, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc, following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
a first touch electrode group comprising a plurality of rows of first touch electrodes; a second touch electrode group comprising a plurality of first columns of second touch electrodes; a third electrode group comprising a plurality of third electrodes arranged as a plurality of second columns of third electrodes; and a fourth electrode group comprising a plurality of fourth electrodes arranged as a plurality of third columns of fourth electrodes and in a layer insulated from the third electrode group;

wherein first touch electrodes in a respective row are spaced apart from each other along a row direction; second touch electrodes in a respective first column are spaced apart from each other along a first column direction; third electrodes in a respective second column are spaced apart from each other along a second column direction; the plurality of rows of first touch electrodes crossing over the plurality of first columns of second touch electrodes forming a plurality of first intersections; the plurality of rows of first touch electrodes are insulated from the plurality of first columns of second touch electrodes at the plurality of first intersections; the plurality of rows of first touch electrodes crossing over the plurality of second columns of third electrodes forming a plurality of second intersections; the plurality of rows of first touch electrodes are insulated from the plurality of second columns of third electrodes at the plurality of second intersections;

wherein the plurality of third electrodes and the plurality of fourth electrodes are configured so that at least one of the plurality of fourth electrodes and at least one of the plurality of third electrodes are movable relative to each other in response to a pressure from a touch, resulting in a change in distance between the at least one of the plurality of fourth electrodes and the at least one of the plurality of third electrodes, and a detectable capacitance change in response to the change in distance;

the first touch electrode group and the second touch electrode group are configured to detect a touch position of the touch;

the third touch electrode group and the fourth touch electrode group are configured to detect a pressure applied by the touch;

the plurality of second columns of third electrodes are electrically insulated from each other;

the third electrodes throughout the respective second column are electrically connected together;

each respective third electrode of the plurality of third electrodes is in a remaining space formed by boundaries of adjacent first touch electrodes of the plurality of rows of first touch electrodes and adjacent second touch electrodes of the plurality of first columns of second touch electrodes;

a total number of the plurality of second columns of third electrodes is the same as a total number of the plurality of third columns of fourth electrodes;

a total number of the plurality third electrodes is the same as a total number of the plurality of fourth electrodes; and two first touch electrodes from two adjacent rows and two second touch electrodes from two adjacent first columns surround a third electrode.

2. The touch substrate of claim 1, wherein a respective one of the plurality of fourth electrodes corresponds to a respective one of the plurality of third electrodes, an orthographic projection of the respective one of the plurality of fourth electrodes at least partially overlaps with an orthographic projection of a corresponding one of the plurality of third electrodes in plan view of the touch substrate.

3. The touch substrate of claim 1, further comprising an elastic layer between the third electrode group and the fourth electrode group; the elastic layer configured to undergo a restorable deformation in response to a pressure from a touch, resulting in the change in distance between the at least one of the plurality of fourth electrodes and the at least one of the plurality of third electrodes.

4. The touch substrate of claim 1, further comprising:

a first bridge layer comprising a plurality of rows of first bridges; a second bridge layer comprising a plurality of first columns of second bridges; and a third bridge layer comprising a plurality of second columns of third bridges;

wherein two adjacent first touch electrodes along the row direction are electrically connected at a respective first intersection through a first bridge; two adjacent second touch electrodes along the first column direction are electrically connected at the respective first intersection through a second bridge; and two adjacent third electrodes along a second column direction are electrically connected at a respective second intersection through a third bridge.

5. The touch substrate of claim 1, further comprising a fourth bridge layer comprising a plurality of rows of fourth bridges;

wherein a respective first touch electrode comprises a first touch electrode block and a second touch electrode block; adjacent first touch electrode block and second touch electrode block along the row direction are electrically connected at a respective first intersection through a first bridge; and adjacent first touch electrode block and second touch electrode block along the row direction are electrically connected at a respective second intersection through a fourth bridge.

6. The touch substrate of claim 5, wherein a third bridge electrically connecting two adjacent third electrodes along a second column direction spaces apart, and is insulated from, the adjacent first touch electrode block and second touch electrode block electrically connected through the fourth bridge at a second intersection.

7. The touch substrate of claim 1, wherein the third electrode has a boundary substantially complementary to at least one corresponding portions of the two first touch electrodes from two adjacent rows and the two second touch electrodes from two adjacent first columns surrounding the third electrode.

8. A touch panel, comprising a touch substrate of claim 1 and an additional touch substrate facing the touch substrate.

9. The touch panel of claim 8, wherein the plurality of third electrodes and the plurality of fourth electrodes are configured so that at least one of the plurality of fourth electrodes and at least one of the plurality of third electrodes are movable relative to each other in response to a pressure from a touch, resulting in a change in distance between the at least one of the plurality of fourth electrodes and the at least one of the third electrodes, and a detectable capacitance change in response to the change in distance;

the first touch electrode group and the second touch electrode group are configured to detect a touch position of the touch; and the third touch electrode group and the fourth touch electrode group are configured to detect a pressure applied by the touch.

10. The touch panel of claim 9, wherein the third electrode group is in the touch substrate, and the fourth electrode group is in the additional touch substrate.

11. The touch panel of claim 9, wherein a respective one of the plurality of fourth electrodes corresponds to a respective one of the plurality of third electrode, an orthographic projection of the respective of the plurality of fourth electrodes at least partially overlaps with an orthographic projection of a corresponding one of the plurality of third electrodes in plan view of the touch substrate.

12. The touch panel of claim 9, further comprising an elastic layer between the third electrode group and the fourth electrode group; the elastic layer configured to undergo a restorable deformation in response to a pressure from a touch, resulting in the change in distance between the at least one of the plurality of fourth electrodes and the at least one of the plurality of third electrodes.

13. The touch panel of claim 12, wherein the touch panel is an on-cell touch panel; the touch substrate is an array substrate, the additional touch substrate is a package substrate, and the elastic layer is an optically clear resin layer for bonding the touch substrate and the additional touch substrate.

14. The touch panel of claim 8, wherein the touch substrate further comprises a first bridge layer comprising a plurality of rows of first bridges; a second bridge layer comprising a plurality of first columns of second bridges; and a third bridge layer comprising a plurality of second columns of third bridges;

wherein two adjacent first touch electrodes along the row direction are electrically connected at a respective first intersection through a first bridge; two adjacent second touch electrodes along the first column direction are electrically connected at the respective first intersection through a second bridge; and two adjacent third electrodes along a second column direction are electrically connected at a respective second intersection through a third bridge.

15. The touch panel of claim 8, wherein the touch substrate further comprises a fourth bridge layer comprising a plurality of rows of fourth bridges;

wherein a respective first touch electrode comprises a first touch electrode block and a second touch electrode block; adjacent first touch electrode block and second touch electrode block along the row direction are electrically connected at a respective first intersection through a first bridge; and adjacent first touch electrode block and second touch electrode block along the row direction are electrically connected at a respective second intersection through a fourth bridge.

16. The touch panel of claim 15, wherein the third bridge electrically connecting two adjacent third electrodes along a second column direction spaces apart, and is insulated from, the adjacent first touch electrode block and second touch electrode block electrically connected through the fourth bridge at a second intersection.

17. The touch panel of claim 8, wherein the third electrode has a boundary substantially complementary to at least one corresponding portions of the two first touch electrodes from two adjacent rows and the two second touch electrodes from two adjacent first columns surrounding the third electrode.

18. The touch panel of claim 8, wherein a ratio among a number of first touch electrodes, a number of second touch electrodes, and a number of third electrodes is in the range of 1:1:1 to 10:10:1.

19. A touch apparatus comprising a touch panel of claim 8.

* * * * *